Figure 1:
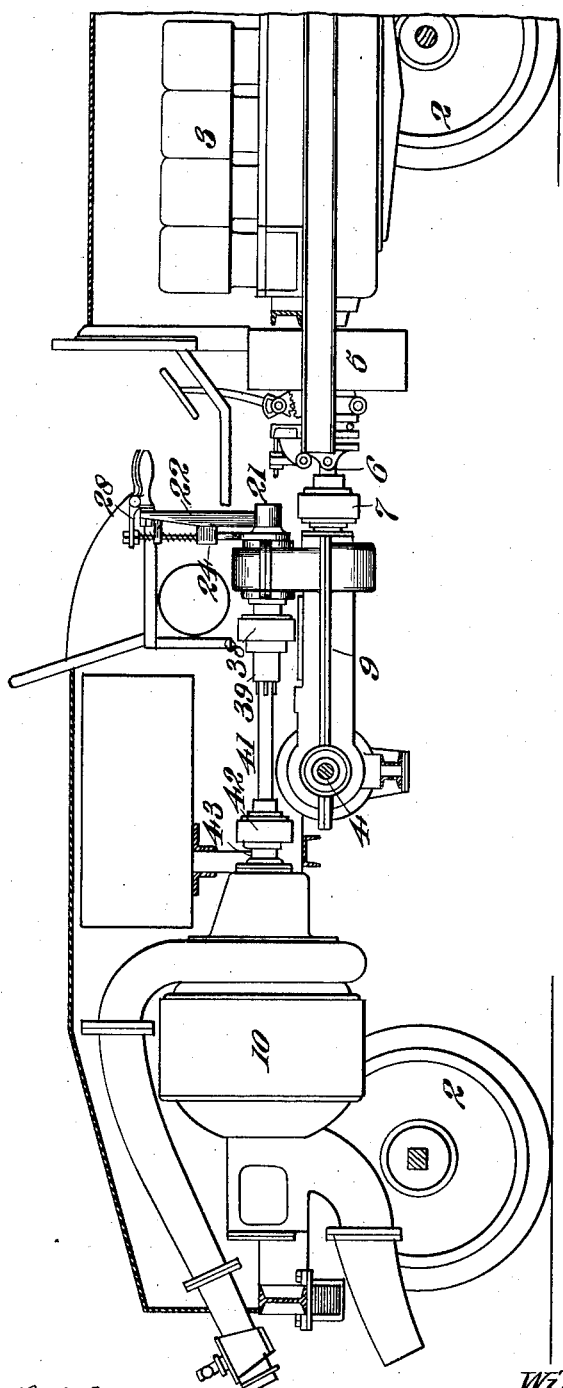

W. R. GORHAM.
GEARING.
APPLICATION FILED MAR. 22, 1913.

1,094,142.

Patented Apr. 21, 1914.
2 SHEETS—SHEET 1.

WITNESSES:
Charles Pickles
F. E. Maynard

INVENTOR
William R. Gorham.
BY G. H. Strong,
ATTORNEY

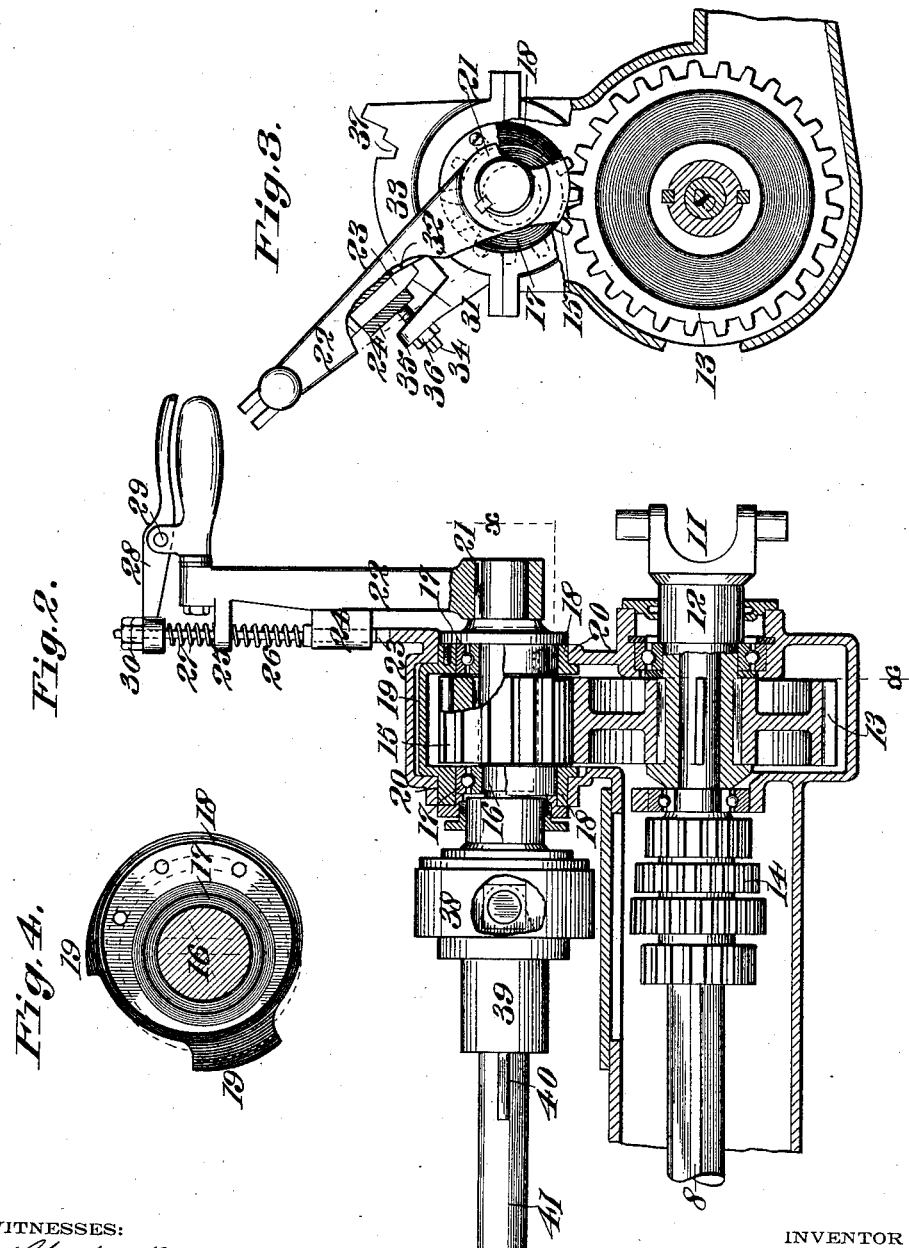

UNITED STATES PATENT OFFICE.

WILLIAM R. GORHAM, OF OAKLAND, CALIFORNIA.

GEARING.

1,094,142.　　　　Specification of Letters Patent.　　Patented Apr. 21, 1914.

Application filed March 22, 1913. Serial No. 756,113.

*To all whom it may concern:*

Be it known that I, WILLIAM R. GORHAM, a citizen of the United States, residing at Oakland, in the county of Alameda and State of California, have invented new and useful Improvements in Gearing, of which the following is a specification.

This invention relates to pumping engine transmission, and particularly relates to an improved transmission whereby power is transmitted from an internal combustion engine, or other source of power, to a centrifugal or turbine pump.

The present invention has special reference to automobile fire-engines, and it is an important object of the invention to provide in combination with the power transmission which drives the running gear of the vehicle by the power derived from the engine, a transmitting mechanism which may be readily coupled to or disconnected from said power transmission for driving the pump of the apparatus.

A special object of the invention is to provide a pump transmitting gearing which is efficient and simple in operation and which is so designed as to eliminate undue stresses and strains.

It is a further object of the invention to design and provide a power transmitting mechanism coöperable with another transmitting gear for parallel eccentric movement with relation thereto, and which is so designed that the wear of the parts can be readily compensated for.

The invention consists of the parts and the construction and combination of parts as hereinafter more fully described and claimed, having reference to the accompanying drawings, in which—

Figure 1 is a side elevation of part of the automobile fire-engine partly in section. Fig. 2 is a detail sectional view partly in elevation of the improved pump transmitting mechanism. Fig. 3 is a section on line $x$—$x$ of Fig. 2. Fig. 4 is a detail view of the eccentric bushing.

In its illustrated embodiment I have shown an automobile fire-engine consisting of the usual traction wheels 2—2 and suitable motor 3 by which power is transmitted to a jack-shaft 4 for propelling the device. Power is transmitted from the engine 3 to the jack-shaft 4 by a suitable form of clutch, indicated at 5, which drives a shaft section 6 carrying a portion of the universal joint, indicated at 7, a member of which is secured on the transmission shaft, Fig. 2, forming a portion of a type of transmitting gear indicated at 9. From the universal clutch 7 power is transmitted independently of the transmission gear 9 from a mechanism to be hereinafter described to a pump 10.

It is one of the important objects of this invention to provide an improved transmitting mechanism, whereby power can be derived from the clutch or driven shaft independently of the traction driving transmission gear, as 9, and which pump transmission is of simple, substantial construction, easy of operation, and reliable in action. For the purpose of relieving the transmission shaft 8, Fig. 2, of strains when the pump 10 is being driven and the transmission gearing 9 disconnected, I have formed one of the members, as 11, of the universal joint 7 with a hub or extended sleeve portion 12. Upon the sleeve portion 12 is securely mounted a gear 13; the transmission shaft 8 being secured to the universal joint member 12 and carrying on its inner end a pinion or pinions 14 constituting elements of the traction drive transmission.

When it is desired to drive the pump 10, there is adapted to be shifted into mesh with the gear 13, on the hub 12, a pinion 15, Fig. 2, which is keyed or otherwise securely fastened on a shaft 16, the ends of which run in ball or other anti-friction bearings 17. The bearings 17 are mounted respectively in a bushing 18, consisting of bearing collars carrying the bearings 17, and are connected by a yoke or tie 19 whereby the bushing structure 18 becomes a rigid or integral member and is adapted for rotation in bearings 20 formed for the reception of the collars of the bushing 18, the exterior circumferences of which collars are eccentric with a common axis to the center of the ball-bearings 17 in which the shaft 16 of the pinion 15 is mounted. By the eccentricity of the bushing of the shaft 16, with relation to the axis of the bearings 20 in which the bushing 18 is turnable, it is possible to shift the shaft 16 about the axis of the bearings 20 and thereby carry the pinion 15 toward or from its companion gear 13.

The axis of the shaft 16 is parallel with the axis of the bearings 20 in which the bushing 18 is turnable, and the axis of the bearings 20 is parallel with the axis of the hub 12 of the joint member 11. The normal working position of the shaft 16, when its gear 15 is intermeshed with the gear 13, is such that it is in approximate axial alinement with the shaft of the pump 10.

The lateral shifting of the pinion shaft 16 with relation to the sleeve or hub 12 may be accomplished by any suitable and appropriate means. In this instance I have shown one of the collars of the bushing 18 as having attached thereto the hub portion 21 of a handle 22, which handle projects upwardly toward the driver's seat of the vehicle. From this position the handle 22 can be rocked so as to turn the eccentric bushing 18, with its shaft 16, to carry the gear 15 into and out of mesh with the pinion 13. By this means of shifting the movable pinion 15 so that it is always in parallelism with the pinion 13, the parts are caused to have a perfect tooth engagement when intermeshed, since the teeth are moved and run constantly in parallelism. For the purpose of sustaining the gears in intermeshed position at the desired line of tooth contact, I have devised and provided a means for effectually accomplishing the desired degree of intermesh with the teeth, and which means also provides a method for the taking up of lost motion and for increasing the depth of mesh with the teeth to compensate for their wear. This locking and take-up device comprises a bolt 23 slidably mounted in an appropriate bearing 24 on one side of the shift lever 22; the bolt having its upper portion extending through a guide or bearing 25, upon opposite sides of which react springs 26 and 27. The lower or inner spring 26 acts to force the bolt 23 downwardly, while the upper one reacts upon a lever 28, fulcrumed at 29 on the upper portion of the handle 22; the lever 28 being provided for the purpose of lifting the bolt 23 by outward movement against adjustable nuts 30 on the stem of the bolt 23. The lower or innermost end of the bolt 23 is wedge-shaped, as at 31, for coöperative engagement with the inclined wall 32 of a rack or sector 33 which may form a part of the bearing or axis member 20.

When the gears 13 and 15 are intermeshed, as is shown in Figs. 2 and 3, the shift lever 22 is thrown over so that the lock bolt 23 is snapped down into the notch formed in front of the inclined wall 32 of the sector 33. The amount of inward projection of the wedge 31 of the snap bolt 23 is determined by an adjusting device consisting of a screw 34 turnable in an arm or ear 35 of the sector 33.

When the mechanism is substantially new and unworn, and the gears 13 and 15 are in intermeshing position, because of the fullness of the teeth of the gears before wear, it will be seen that they will be brought into normal running contact as soon as they are shifted, relatively, to the desired degree. A further movement or jamming of the gears is then prevented by adjusting the screw 34 inwardly and locking the same with the jam nut 36, whereupon the wedge 31 will react against the coöperative wedge-like wall 32 of the sector 33, and under the action of the expansion spring 26 upon the bolt 23 this latter will be held firmly and without vibration in position, thereby holding the gears in mesh.

Assuming that the gears have been in use for sometime and wear has taken place on the faces of the teeth, the wear can be compensated for and back lash prevented by turning the screw 34 outwardly in the ear 35, to permit the arm 22 with the bolt 26 to rock a little farther downward to cause the shaft 16 to carry the teeth of the gear 15 deeper into the teeth spaces of the gear 13. Inasmuch as the wedge point 31 of the bolt 23 is opposed by a cam or wedge surface on the sector 33, it will be seen that for each adjustment of the screw 34 the spring 26 will act to thrust the bolt 23 farther inwardly to carry the wedge against its coöperative inclined fixed surface 32 to compensate for the take-up, and still maintain the parts in rigid, non-vibrating position.

When the operator desires to carry the gear 15 out of mesh with the pinion 13, he simply clasps the upper portion of the handle 22, forcing downwardly the adjacent end of lever 28, thus lifting the bolt 23 from the recess in front of the wedge face 32 and is then able to swing the lever 22 to an upright position above the sector where the bolt point 31 can be released and engage an indent 37 formed for its reception in the sector 33 to hold the gears from operative relation.

Having provided means for insuring an efficient working alinement of the gears 13 and 15 by obtaining a parallel movement relatively, it is desirable that power be transmitted from the pinion 15, when this is engaging the gear 13, without undue binding or friction of parts. To that end there is secured on one end of the shaft 16 a universal joint member 38 coöperating with a joint member 39, which is here shown as keyed or splined, as at 40, for longitudinal movement on an impeller or short shaft 41 which is universally jointed, as at 42, to the pump shaft 43.

The highest mechanical efficiency of the transmitting gear is obtained by maintaining the parts, when in running engagement, with their shafts and axes in alinement. To this end I have shown the shaft 43 of the pump 10, the shaft section 41, and the pinion shaft 16 as coupled, all being arranged in alinement when the pump is to be driven. When so arranged the pinion 15 is maintained in parallel relation with its companion driving gear 13, thereby obtaining maximum driving efficiency and uniform wear between these gears. As the gear 15 is moved to inoperative position from mesh with gear 13 by a parallel shifting motion, the universal joint member 39 on shaft 41 is capable of free sliding movement to compensate for the eccentricity of the axis of the gear 15 with relation to the axis of the pump 10.

Having thus described my invention, what I claim and desire to secure by Letters Patent is—

1. A motor, an intermediate shaft in substantial alinement with the motor shaft and an intermediate clutch, a second shaft parallel with the intermediate shaft, a gear mounted upon the intermediate shaft contiguous to its inner bearing, a pinion mounted upon the second shaft, an eccentric bushing forming a bearing, and means to turn the bushing to engage or disengage the pinion with the gear.

2. A motor, a driving shaft in line with the motor shaft and a housing therefor, an intermediate clutch, a gear carried by said driving shaft in the housing and between the bearings thereof, a countershaft, a pinion upon said countershaft coacting with the gear to derive power from said first named shaft, an eccentric bushing and bearings for the countershaft, and means to turn the bushing to engage and disengage the pinion and the gear.

3. A motor, a driving shaft in line with the motor shaft and a housing therefor, an intermediate clutch, a gear carried by the driving shaft in the housing between the bearings thereof, a countershaft, a pinion upon said countershaft coacting with said gear, an eccentric bushing and bearings for the countershaft, means to turn the bushing to engage and disengage the pinion and the gear, and a universal joint connection in the line of the countershaft.

4. In an apparatus of the character described, a motor, a universal joint connection with the motor shaft, one member of said joint having a sleeve-like hub and bearings therefor, a shaft engaging said hub in axial line therewith, a gear mounted upon said hub, a countershaft, a pinion thereon adapted to engage with said gear, an eccentric bushing with bearings for the pinion shaft, and a housing within which the bushing is turnable to move the pinion into or out of engagement with the gear, and means to compensate for wear between the engaging teeth of the pinion and gear.

In testimony whereof I have hereunto set my hand in the presence of two subscribing witnesses.

WILLIAM R. GORHAM.

Witnesses:
W. F. FORWARD,
W. A. SMITH.